US009692053B2

(12) United States Patent
Oh et al.

(10) Patent No.: US 9,692,053 B2
(45) Date of Patent: Jun. 27, 2017

(54) MIXED CATHODE ACTIVE MATERIAL HAVING IMPROVED POWER CHARACTERISTICS AND SAFETY, AND LITHIUM SECONDARY BATTERY INCLUDING THE SAME

(71) Applicant: LG Chem, Ltd., Seoul (KR)

(72) Inventors: Song Taek Oh, Daejeon (KR); Sang Uck Lee, Daejeon (KR); Su Rim Lee, Daejeon (KR); Geun Chang Chung, Daejeon (KR); Jae Kook Kim, Daejeon (KR); Jin Sub Lim, Daejeon (KR)

(73) Assignee: LG Chem, Ltd. (KR)

( * ) Notice: Subject to any disclaimer, the term of this patent is extended or adjusted under 35 U.S.C. 154(b) by 229 days.

(21) Appl. No.: 14/307,606

(22) Filed: Jun. 18, 2014

(65) Prior Publication Data
US 2014/0291588 A1     Oct. 2, 2014

Related U.S. Application Data

(63) Continuation of application No. PCT/KR2013/007009, filed on Aug. 2, 2013.

(30) Foreign Application Priority Data

Aug. 2, 2012 (KR) .......................... 10-2012-0084756

(51) Int. Cl.
*H01M 4/88* (2006.01)
*H01M 4/505* (2010.01)
(Continued)

(52) U.S. Cl.
CPC ........... *H01M 4/505* (2013.01); *H01M 4/131* (2013.01); *H01M 4/364* (2013.01); *H01M 4/525* (2013.01);
(Continued)

(58) Field of Classification Search
CPC ......... H01M 4/131; H01M 4/364; H01M 4/52
(Continued)

(56) References Cited

U.S. PATENT DOCUMENTS 9,240,592 B2 * 1/2016 Oh ....................... H01M 4/364
2002/0094481 A1 * 7/2002 Goto ..................... H01M 4/364
429/218.1
(Continued)

FOREIGN PATENT DOCUMENTS

JP        2002117903 A       4/2002
JP        2002-216755     *  8/2002  .............. H01M 4/58
(Continued)

OTHER PUBLICATIONS

Written Opinion for PCT/KR2013/007009 mailed Nov. 4, 2013.
(Continued)

*Primary Examiner* — Khanh Tuan Nguyen
(74) *Attorney, Agent, or Firm* — Lerner, David, Littenberg, Krumholz & Mentlik, LLP (57) ABSTRACT

Provided are a mixed cathode active material having improved power characteristics and safety, and a lithium secondary battery including the same. More particularly, the present invention relates to a mixed cathode active material which may assist power in a low SOC range to widen an available state of charge (SOC) range and may simultaneously provide improved safety by blending substituted LFP, in which operating voltage is adjusted by substituting a portion of iron (Fe) with other elements such as titanium (Ti), in order to prevent a rapid increase in resistance of manganese (Mn)-rich having high capacity but low operating voltage in a low SOC range (e.g., a SOC range of 10% to 40%), and a lithium secondary battery including the mixed cathode active material.

12 Claims, 3 Drawing Sheets

RESULT OF VOLTAGE CALCULATION FOR SUBSTITUTION OF 6.25%
(BASED ON 3.4 V)

(51) Int. Cl.
  *H01M 4/36*    (2006.01)
  *H01M 4/525*   (2010.01)
  *H01M 4/58*    (2010.01)
  *H01M 4/62*    (2006.01)
  *H01M 4/131*   (2010.01)
  *H01M 10/052*  (2010.01)

(52) U.S. Cl.
  CPC ......... *H01M 4/5825* (2013.01); *H01M 4/625* (2013.01); *H01M 10/052* (2013.01)

(58) Field of Classification Search
  USPC ................... 252/182.1; 429/211, 219, 218.1
  See application file for complete search history.

(56) References Cited

U.S. PATENT DOCUMENTS

| | | | |
|---|---|---|---|
| 2006/0051671 | A1 | 3/2006 | Thackeray et al. |
| 2008/0083901 | A1 | 4/2008 | Park |
| 2008/0311432 | A1 | 12/2008 | Park et al. |
| 2010/0248038 | A1 | 9/2010 | Takami et al. |
| 2011/0244324 | A1* | 10/2011 | Jang ............... H01M 4/131 429/211 |
| 2011/0311869 | A1 | 12/2011 | Oh et al. |
| 2011/0311872 | A1* | 12/2011 | Oh ................. H01M 4/364 429/219 |
| 2013/0017449 | A1 | 1/2013 | Yasuda et al. |

FOREIGN PATENT DOCUMENTS

| | | |
|---|---|---|
| JP | 2005174661 A | 6/2005 |
| JP | 2009029670 A | 2/2009 |
| JP | 2010225486 A | 10/2010 |
| JP | 2011-134708 A | 7/2011 |
| JP | 2011134670 A | 7/2011 |
| JP | 2012033507 | 2/2012 |
| KR | 20070083550 A | 8/2007 |
| KR | 20080031616 A | 4/2008 |
| KR | 20080109298 A | 12/2008 |
| KR | 20110097719 A | 8/2011 |
| KR | 10-1139972 B1 | 4/2012 |
| WO | 2011105833 A2 | 9/2011 |
| WO | 2011132369 A1 | 10/2011 |

OTHER PUBLICATIONS

International Search Report for PCT/KR2013/007009 mailed Nov. 4, 2013.

Search Report for European Application No. 13825157.4, dated Feb. 5, 2015.

Kevin G. Gallagher et al., "xLi2MnO3 (1-x)LiMO2, blended with LiFePO4 to achieve high energy density and pulse power capability," Journal of Power Sources, Elsevier SA, CH vol. 196 (2011), No. 22, pp. 9702-9707.

* cited by examiner

MIXED CATHODE ACTIVE MATERIAL HAVING IMPROVED POWER CHARACTERISTICS AND SAFETY, AND LITHIUM SECONDARY BATTERY INCLUDING THE SAME

CROSS-REFERENCED TO RELATED APPLICATIONS

The present application is a continuation of International Application No. PCT/KR2013/007009 filed on Aug. 2, 2013, which claims the benefit of Korean Patent Application No. 10-2012-0084756, filed on Aug. 2, 2012, the disclosures of which are incorporated herein by reference.

TECHNICAL FIELD

The present invention relates to a mixed cathode active material having improved power characteristics and safety, and a lithium secondary battery including the same, and more particularly, to a mixed cathode active material which may assist power in a low SOC range to widen an available state of charge (SOC) range and may simultaneously provide improved safety by blending substituted LFP, in which operating voltage is adjusted by substituting a portion of iron (Fe) with other elements such as titanium (Ti), in order to prevent a rapid increase in resistance of manganese (Mn)-rich having high capacity but low operating voltage in a low SOC range (e.g., a SOC range of 10% to 40%), and a lithium secondary battery including the mixed cathode active material.

BACKGROUND ART

Recently, lithium secondary batteries have been used in various fields including portable electronic devices, such as mobile phones, personal digital assistants (PDAs), and laptop computers. In particular, in line with growing concerns about environmental issues, research into lithium secondary batteries having high energy density and discharge voltage as a power source of an electric vehicle, which may replace vehicles using fossil fuels such as gasoline vehicle and diesel vehicle, one of major causes of air pollution, has been actively conducted and some of the research are in a commercialization stage. In order to use a lithium secondary battery as a power source of the electric vehicle, the lithium secondary battery must maintain stable power in a usable state of charge (SOC) range along with high power.

With respect to a typical cathode material of $LiCoO_2$, as a cathode material of a lithium secondary battery for realizing high capacity, practical limits of an increase in energy density and power characteristics have been reached. In particular, when $LiCoO_2$ is used in high energy density applications, oxygen in a structure of $LiCoO_2$ is discharged along with structural degeneration in a high-temperature charged state due to its structural instability to generate an exothermic reaction with an electrolyte in a battery, and thus, it becomes a main cause of battery explosion. In order to improve the safety limitation of $LiCoO_2$, the use of lithium-containing manganese oxides, such as $LiMnO_2$ having a layered crystal structure and $LiMn_2O_4$ having a spinel crystal structure, and lithium-containing nickel oxide ($LiNiO_2$) have been considered, and a great deal of research into using ternary layered oxide of $LiNi_xMn_yCo_{1-x-z}O_2$ (hereinafter, referred to as "NMC") has recently been conducted.

Nickel (Ni) in $Li[Ni_{1/3}Co_{1/3}Mn_{1/3}]O_2$, which is the most representative among the NMC, may change from $Ni^{+2}$ to $Ni^{+3}$ or $Ni^{+4}$ according to SOC during charge. In this case, $Ni^{+3}$ or $Ni^{+4}$ (particularly, $Ni^{+4}$), different from stable $Ni^{+2}$, may lose lattice oxygen due to its instability to be reduced into $Ni^{+2}$, and the lattice oxygen may change surface properties of an electrode or may increase a charge transfer impedance of the surface by reacting with an electrolyte solution to reduce capacity or degrade high-rate capability.

In order to address such limitations of NMC, research into mixing olivine-structured lithium oxide, for example, $LiFePO_4$ (hereinafter, referred to as "LFP") with the NMC has been conducted.

However, in a case where LFP is mixed with NMC, a rapid voltage drop may occur near 3.4 V to 3.6 V during discharge due to the difference in operating voltage.

In order to address the above limitations, a method of mixing the LFP with lithium manganese oxide (hereinafter, referred to as "Mn-rich"), in which manganese (Mn) as an essential transition metal is added to layered-structure lithium manganese oxide as a high-capacity material in a larger amount than other transition metals (excluding lithium), may be considered.

However, in a case where Mn-rich and LFP are blended, since the operating voltage of the Mn-rich is generally lower than NMC, LFP may early participate in discharge after discharge of about 50%. Thus, the Mn-rich may be difficult to assist power at a lower end of SOC. A portion mainly requiring the power assistance as resistance increases in the lower end of SOC may be a SOC range of about 10% to 40%. However, a voltage in this range becomes lower than that of LFP. That is, in the case of blending of NMC and LFP, since the LFP may be discharged after the discharge of the NMC is completed (apart from the above-described rapid voltage drop near 3.4 V to 3.6 V), the LFP may compensate for power reduction due to the increase in resistance at the lower end of SOC (SOC range of 10% to 40%). However, in the case of blending of Mn-rich and LFP, the LFP may not compensate for the power reduction.

Thus, with respect to a cathode material including Mn-rich, there is an urgent need to develop a new cathode material capable of widening an available SOC range by alleviating the rapid power reduction in a low SOC range (e.g., a SOC range of 10% to 40%) as well as providing improved safety.

DISCLOSURE OF THE INVENTION

Technical Problem

As a result of in-depth study and various experimentations, the inventors of the present application developed a mixed cathode active material which may maintain a predetermined power level or more over an entire SOC range without rapid power reduction during charge and discharge.

The present invention provides a mixed cathode active material having significantly improved power characteristics and safety due to the absence of the rapid power reduction in a low SOC range.

The present invention also provides a lithium secondary battery including the mixed cathode active material.

Technical Solution

According to an aspect of the present invention, there is provided a mixed cathode active material including lithium manganese oxide (Mn-rich) represented by Chemical Formula 1 and a second cathode active material represented by Chemical Formula 2:

[Chemical Formula 1]

where, $0<a<1$ (particularly, $0.3<a<0.6$), $0.9 \leq x \leq 1.2$ (particularly, $x=1$), and M is one, or two or more elements selected from the group consisting of aluminum (Al), magnesium (Mg), manganese (Mn), nickel (Ni), cobalt (Co), chromium (Cr), vanadium (V), and iron (Fe); and

[Chemical Formula 2]

where, M is one, or two or more elements selected from the group consisting of scandium (Sc), titanium (Ti), Cr, V, Mn, Ni, Co, copper (Cu), and zinc (Zn), and essentially comprises any one of Sc, Ti, Cr, and V;

M' is one, or two or more transition metal elements among transition elements;

X is one or more selected from the group consisting of phosphorous (P), silicon (Si), sulfur (S), arsenic (As), and antimony (Sb); $0<x<1$ (particularly, $0<x<0.25$); and $0 \leq y < 0.5$.

Typical examples of the second cathode active material may be $LiFe_{1-x}M_xPO_4$ (where M is one, or two or more elements selected from the group consisting of Sc, Ti, Cr, and V, and $0<x<1$).

According to another aspect of the present invention, there is provided a cathode including the mixed cathode active material, and a lithium secondary battery including the cathode.

Advantageous Effects

A mixed cathode active material according to the present invention is prepared by mixing Mn-rich and a second cathode active material exhibiting a low discharge region in which a portion of Fe in pure LFP is substituted with Ti or the like, wherein since the substituted LFP is used, the present invention may provide a lithium secondary battery in which power characteristics and safety of the cell are significantly improved in comparison to a case, in which a rapid increase in resistance (power reduction) in a low SOC range may not be sufficiently compensated when Mn-rich and pure-LFP are blended.

MODE FOR CARRYING OUT THE INVENTION

Hereinafter, the present invention will be described in detail.

According to an aspect of the present invention, there is provided a cathode active material in which layered-structure lithium manganese oxide (Mn-rich) represented by Chemical Formula 1 is mixed with a second cathode active material having an operating voltage (discharge voltage) lower than the Mn-rich, for example, near 2.5 V to 3.4 V:

[Chemical Formula 1]

where, $0<a<1$ (particularly, $0.3<a<0.6$), $0.9 \leq x \leq 1.2$ (particularly, $x=1$), and M is one, or two or more elements selected from the group consisting of aluminum (Al), magnesium (Mg), manganese (Mn), nickel (Ni), cobalt (Co), chromium (Cr), vanadium (V), and iron (Fe).

The layered-structure lithium manganese oxide (Mn-rich) represented by Chemical Formula 1 is a kind of lithium transition metal oxides which include Mn as an essential transition metal, include Mn in a larger amount than other transition metals excluding lithium, and exhibit high capacity during overcharge at a high voltage.

Furthermore, the layered-structure lithium manganese oxide (Mn-rich) is a material which may provide lithium ions that are consumed in an initial irreversible reaction on the surface of an anode, and may also provide an additional lithium source by transferring lithium ions that have not been used in the irreversible reaction at the anode to a cathode during subsequent discharge.

Since Mn included as an essential transition metal in the layered-structure lithium manganese oxide may be included in a larger amount than other transition metals (excluding lithium), Mn may be included in an amount of 50 mol % to 80 mol % based on a total amount of the metals excluding lithium.

In the case that the amount of Mn is excessively small, safety may be reduced, manufacturing costs may increase, and unique characteristics of the Mn-rich may not be exhibited. In contrast, in the case in which the amount of Mn is excessively large, cycle stability may be reduced.

Also, the Mn-rich has a predetermined range of plateau potential above oxidation/reduction voltage appearing due to the changes in oxidation numbers of components in the cathode active material. Specifically, the Mn-rich may have a plateau potential range near 4.5 V to 4.8 V during overcharge at a high voltage of 4.5 V or more based on cathode voltage.

The Mn-rich has high power in a high SOC range as described above, but the power may be decreased due to the increase in resistance in a lower SOC range (e.g., 3.5 V or less). The same is also true for the case in which a cathode active material having a higher operating voltage than the Mn-rich is mixed, and the reason for this is that only the Mn-rich operates alone in a relatively low SOC range.

Figure 2:
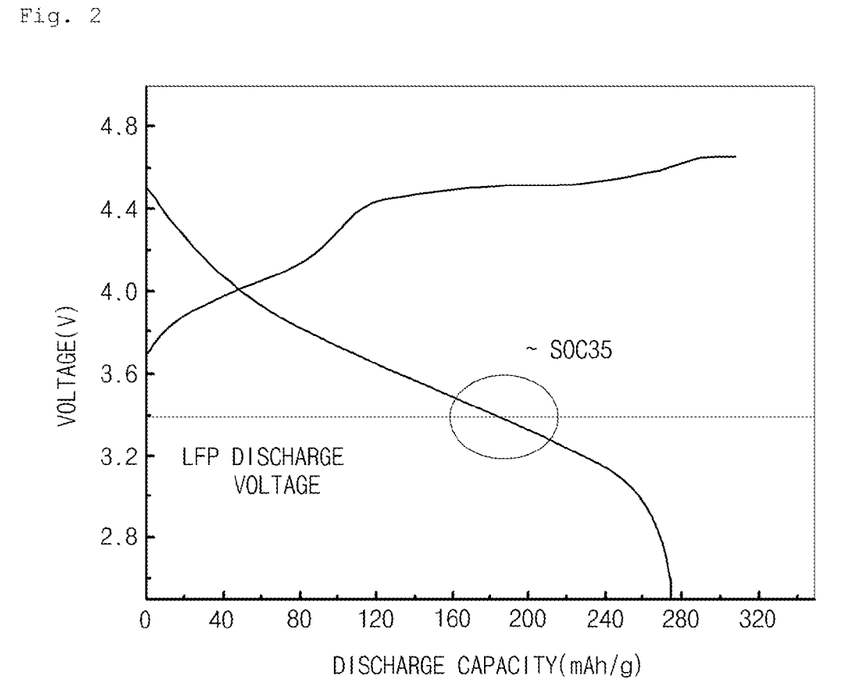
FIG. 2 is a graph comparing a position of discharge voltage of pure-LFP and charge and discharge curves when 100% of Mn-rich is used as a cathode active material.

In order to address such limitations, a method of blending Mn-rich and LFP ($LiFePO_4$) is being studied. However, in this case, the power in a low SOC range, in which substantial power assistance is urgently required, for example, a SOC range of 10% to 40%, may not be sufficiently assisted. The reason for this is that since the LFP has a relatively high operating voltage of about 3.4 V to about 3.5 V, the LFP may early participate in discharge at about 30% to 50% SOC (see FIG. 2). Therefore, characteristics of LFP having excellent safety are maintained, but there is a need to modify the LFP into a form that may effectively assist the power in a low SOC range when the LFP is used with the high-capacity Mn-rich.

In this respect, the present invention provides a mixed cathode active material, in which the Mn-rich and a material having a somewhat lower operating voltage than the Mn-rich, as a second cathode active material, are mixed.

The second cathode active material is mixed for assisting the power reduction of the Mn-rich in a low SOC range and is required to have plateau potential at a voltage lower than that at an operating voltage limit of the Mn-rich.

Specifically, the second cathode active material may have a plateau voltage profile in a range of 2.5 V to 3.4 V and for example, may have a plateau voltage profile in a range of 2.7 V to 3.4 V.

As a result, the second cathode active material, in addition to the Mn-rich, is involved in intercalation and deintercalation processes of lithium (Li) in a low SOC range of the Mn-rich, i.e., in a range of 3.5 V or less, and thus, a lithium secondary battery may be provided, in which an available SOC range becomes very wide by assisting the low power of the Mn-rich within the above voltage range.

In a case where the second cathode active material is mixed with the Mn-rich, the power in a high SOC range may be somewhat lower than a case of using a cathode active material including the Mn-rich alone due to a composition ratio of the Mn-rich that is decreased as much as a fraction of the included second cathode active material.

However, with respect to a lithium secondary battery used in series-type PHEVs or EVs, a lithium secondary battery, which may maintain a predetermined power in a wider SOC range, is required rather than a lithium secondary battery exhibiting high capacity in a limited range of specific voltage. Therefore, the mixed cathode active material according to the present invention and the lithium secondary battery including the same may be particularly suitable for operating devices which must maintain a predetermined power level or more without rapid power reduction over the entire SOC range, for example, series-type PHEVs or EVs. However, the use thereof is not necessarily limited thereto.

Specifically, the second cathode active material according to the present invention is represented by Chemical Formula 2 below:

$$LiFe_{1-x}M_xM'_yXO_4 \quad \text{[Chemical Formula 2]}$$

where, M is one, or two or more elements selected from the group consisting of scandium (Sc), titanium (Ti), Cr, V, Mn, Ni, Co, copper (Cu), and zinc (Zn), and essentially comprises any one of Sc, Ti, Cr, and V;

M' is one, or two or more transition metal elements among transition elements;

X is one or more selected from the group consisting of phosphorous (P), silicon (Si), sulfur (S), arsenic (As), and antimony (Sb);

$0<x<1$ (particularly, $0<x<0.25$; more particularly, $0<x\leq0.1$); and $0\leq y<0.5$ (particularly, $y=0$).

The second cathode active material is a modified material, in which a portion of Fe in LFP is substituted with Sc, Ti, Cr, V or the like to have a low operating voltage ranging from 2.5 V to 3.4 V. Accordingly, the second cathode active material may not only increase the ratio of the Mn-rich appearing above a discharge voltage of the LFP, but may also secure a discharge region in a range of 2.5 V to 3.4 V, and thus, the second cathode active material may effectively assist the power at a lower end of SOC in comparison to the case of blending pure LFP.

Figure 1:
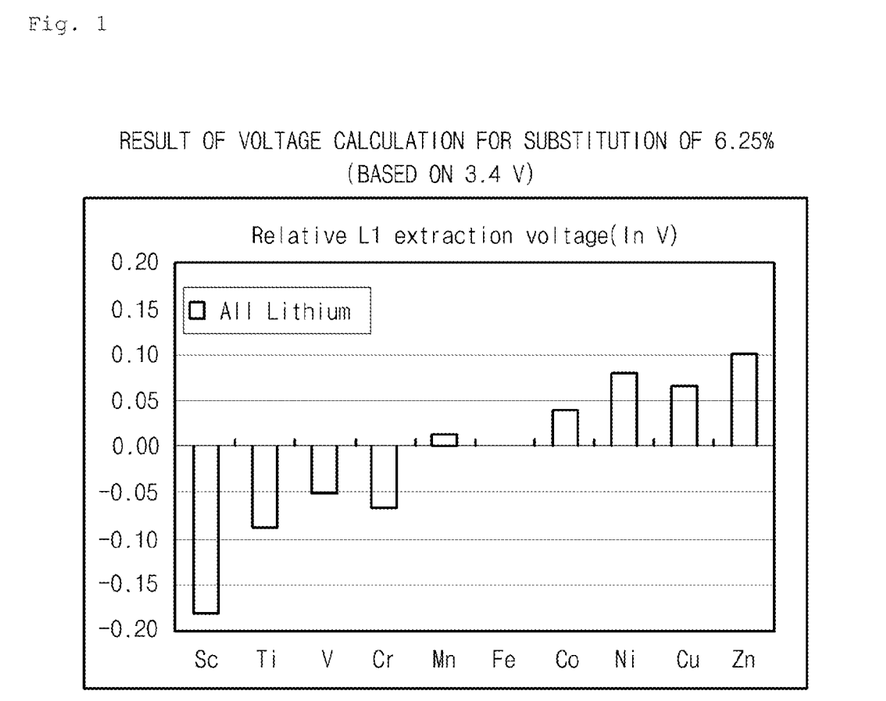
FIG. 1 is a graph illustrating changes in voltage when 6.25% of Fe in pure-LFP is substituted with other transition metals.

In this case, one or more of Sc, Ti, Cr, and V are necessarily included in the second cathode active material. However, in some cases, elements which rather increase the operating voltage, such as Mn, Ni, Co, Cu, and Zn, may also be included. That is, a final operating voltage of LFP may be decreased to a desired level by adjusting the type and substitution amount of a substitution element (see FIG. 1).

The mixed cathode active material according to an embodiment of the present invention may include lithium manganese oxide represented by Chemical Formula 1-1 and a second cathode active material represented by Chemical Formula 2-1:

$$aLi_2MnO_3 \cdot (1-a)LiMO_2 \quad \text{[Chemical Formula 1-1]}$$

where, $0<a<1$ (particularly, $0.3<a<0.6$), and M is one, or two or more elements selected from the group consisting of Al, Mg, Mn, Ni, Co, Cr, V, and Fe; and $$LiFe_{1-x}M_xPO_4 \quad \text{[Chemical Formula 2-1]}$$

where M is one, or two or more elements selected from the group consisting of Sc, Ti, Cr, and V, and $0<x<1$ (particularly, $0<x<0.25$).

A method of forming a mixed cathode material by mixing the Mn-rich and the second cathode active material is not significantly limited, and various methods known in the art may be selected.

Also, the second cathode active material may be included in an amount of 5 parts by weight to 30 parts by weight, for example, 10 parts by weight to 30 parts by weight based on 100 parts by weight of the mixed cathode material. In the case that the amount of the second cathode active material is greater than 30 parts by weight, a high-energy lithium secondary battery may be difficult to be obtained. In the case in which the amount of the second cathode active material is less than 5 parts by weight, the amount of the second cathode active material included may be excessively low, and thus, the objective of the present invention, such as the power assistance in a low SOC range and safety improvement, may be difficult to be achieved.

Furthermore, in a case where a mixed cathode material of the Mn-rich and the second active material is formed, it is necessary to consider limitations which may occur due to the difference in particle sizes or (specific) surface areas of both materials.

Specifically, it may be desirable to limit the difference in particle sizes or (specific) surface areas of two or more cathode active materials that are mixed in the present invention or use an appropriate conductive system in consideration of this. Since a conductive agent may be uniformly distributed without segregation by controlling the particle size to be uniform, the conductivity of the mixed cathode material may be further improved.

Thus, according to the present invention, an appropriate treatment may be performed on the Mn-rich and the second cathode active material so as to control the particle sizes of both materials to be similar to each other. According to an exemplary embodiment of the present invention, any one cathode active material having a smaller particle size may be sintered to be agglomerated so as to have its particle size uniform with that of another cathode active material having a relatively larger particle size, and thus, secondary particles of the cathode active material may be formed.

In this case, methods of the sintering and secondary particle formation are not particularly limited and methods known in the art may be used.

Since the particle sizes and forms of the two or more cathode active materials to be mixed are made to be as uniform as possible, a phenomenon may be prevented in which a conductive agent coated on the mixed cathode active material is concentrated on any one cathode active material having a high (specific) surface area and thus, conductivity of another cathode active material, in which a relatively smaller amount of the conductive agent is distributed, is significantly decreased. As a result, the conductivity of the mixed cathode active material may be significantly improved.

In order to decrease the difference in the particle sizes or specific surface areas of the two or more cathode active materials to be mixed, a method of forming a cathode active material having a relatively smaller particle size as larger secondary particles as described above, a method of forming a cathode active material having a relatively larger particle size as smaller particles, or a method of simultaneously using both methods may be used.

Next, the mixed cathode active material may include two or more conductive agents having different particle sizes or shapes. A method of including conductive agents is not significantly limited and a typical method known in the art, such as coating of the cathode active material, may be used. As described above, this is for preventing the phenomenon, in which the conductive agent is concentrated on any one cathode active material due to the particle size difference between the cathode active materials to be mixed. According to an exemplary embodiment of the present invention, graphite and conductive carbon may be simultaneously used as the conductive agent.

Since the mixed cathode active material is coated simultaneously with graphite and conductive carbon having different particle sizes or shapes as the conductive agent, the conductivity reduction or low power of the entire cathode active material due to the difference in the particle sizes or surface areas of the Mn-rich and the second cathode active material may be more effectively improved. Simultaneously, a high-capacity mixed cathode active material having a wide available SOC range may be provided.

The graphite and conductive carbon are not particularly limited so long as they have excellent electrical conductivity and do not cause a side reaction in the inner environment of the lithium secondary battery or chemical changes in the present battery as well as having electrical conductivity.

Specifically, nature graphite or artificial graphite may be used without limitation as the graphite. A carbon-based material having high electrical conductivity may be particularly used as the conductive carbon, and specifically, one or a mixture of two or more selected from the group consisting of carbon black, such as acetylene black, Ketjen black, channel black, furnace black, lamp black, or thermal black, and a material having a crystal structure of graphene or graphite may used as the conductive carbon. In some cases, a conductive polymer having high electrical conductivity may be used.

Herein, the conductive agent formed of the graphite and the conductive carbon may be included in an amount of 0.5 to 15 parts by weight based on 100 parts by weight of the mixed cathode material. In the case that the amount of the conductive agent is excessively low, as less than 0.5 parts by weight, the above-described effects may not be expected, and in the case in which the amount of the conductive agent is excessively high, as greater than 15 parts by weight, high capacity or high energy density may not be obtained due to the relatively less amount of the cathode active material.

In this case, the conductive carbon may be included in an amount of 1 to 13 parts by weight based on 100 parts by weight of the mixed cathode material and for example, may be included in an amount of 3 to 10 parts by weight.

Furthermore, the mixed cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein. The other elements may be one or more selected from the group consisting of Al, Mg, Ni, Co, Fe, Cr, V, Ti, Cu, boron (B), calcium (Ca), Zn, zirconium (Zr), niobium (Nb), molybdenum (Mo), strontium (Sr), Sb, tungsten (W), and bismuth (Bi).

In this case, the lithium-containing metal oxide may be included in an amount of 50 parts by weight or less based on 100 parts by weight of the mixed cathode material.

The present invention relates to a cathode having a current collector coated with the mixed cathode material, and a lithium secondary battery including the cathode.

In general, a lithium secondary battery is composed of a cathode including a cathode material and a current collector, an anode including an anode material and a current collector, and a separator that may block electrical contact between the cathode and the anode and may conduct lithium ions. An electrolyte solution for the conduction of lithium ions is included in voids of electrode and separator materials.

The cathode and the anode are generally prepared by coating the current collector with a mixture of electrode active material, conductive agent, and binder, and then drying the coated collector. A filler may be further added to the mixture if necessary.

The lithium secondary battery of the present invention may be prepared according to a typical method known in the art. Specifically, the lithium secondary battery may be prepared by inserting a porous separator between the cathode and the anode, and introducing a non-aqueous electrolyte solution.

According to an exemplary embodiment of the present invention, the secondary battery may limit power variation in a specific SOC range within a predetermined range in order to maintain stable power and improve safety in a low SOC range.

For example, power of the lithium secondary battery in a SOC range of 20% to 40% may be 40% or more of power at 50% SOC and specifically, may be 50% or more of the power at 50% SOC.

The mixed cathode active material of the present invention, the cathode, and the lithium secondary battery may be particularly suitable for operating devices which must maintain a predetermined power level or more without rapid power reduction over the entire SOC range, wherein since the second cathode active material may assist low power characteristics due to the rapid increase in resistance of the Mn-rich in a low SOC range, the power may be maintained at a required level or more even at a low SOC (e.g., 10% to 40% SOC) to widen an available SOC range and simultaneously, improve safety.

Hereinafter, the present invention will be described in detail, according to specific examples.

EXAMPLE

Preparation of Cathode

A slurry was prepared by adding 88 wt % of a mixture composed of $0.5Li_2MnO_3 \cdot 0.5LiMn_{1/3}Ni_{1/3}Co_{1/3}O_2$(Mn-rich, 70 wt %) and $LiTi_{0.1}Fe_{0.9}PO_4$ (30 wt %) as a cathode active material, 6 wt % of Denka black as a conductive agent, and 6 wt % of polyvinylidene fluoride (PVDF) as a binder to N-methylpyrrolidone (NMP). An aluminum (Al) foil as a cathode current collector was coated with the slurry, and the coated Al foil was then rolled and dried to prepare a cathode for a lithium secondary battery.

Preparation of Lithium Secondary Battery

A porous polyethylene separator was disposed between the cathode thus prepared and a graphite-based anode, and a lithium electrolyte solution was injected to prepare a polymer-type lithium secondary battery.

The polymer-type lithium secondary battery was subjected to formation at 4.6 V, and power was then measured according to SOC while the polymer-type lithium secondary battery was charged and discharged between 2 V and 4.5 V (C-rate=1C).

Comparative Example 1

A polymer-type lithium secondary battery was prepared in the same manner as in Example except that LiFePO$_4$ was used instead of LiTi$_{0.1}$Fe$_{0.9}$PO$_4$ as a second cathode active material.

Comparative Example 2

A polymer-type lithium secondary battery was prepared in the same manner as in Example except that an electrode was prepared only using 0.5Li$_2$MnO$_3$·0.5LiMn$_{1/3}$Ni$_{1/3}$Co$_{1/3}$O$_2$ (Mn-rich, 100 wt %) without using a second cathode active material.

Experimental Example

Figure 3:
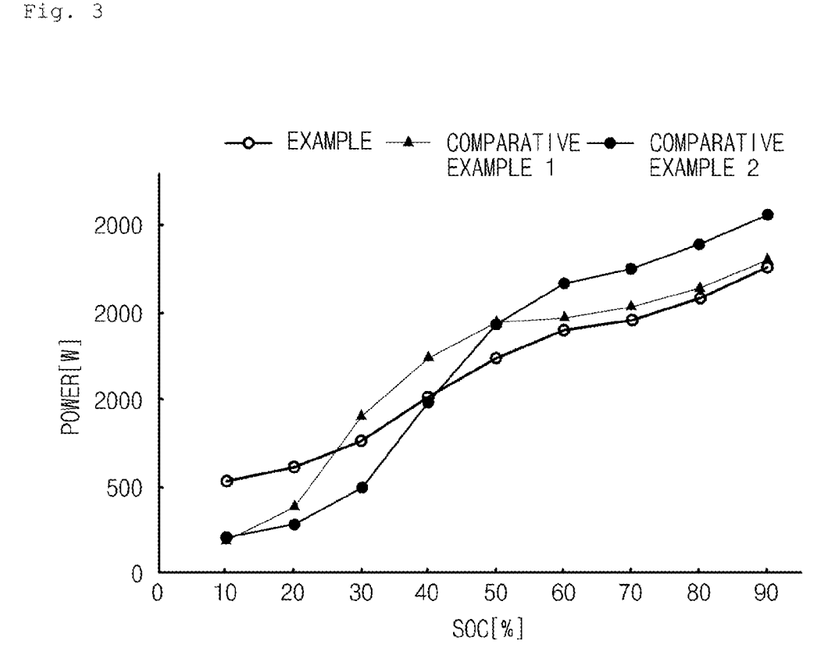
FIG. 3 is a graph illustrating changes in power according to each SOC of lithium secondary batteries according to Example and Comparative Examples 1 and 2 of the present invention.

Changes in power according to SOC were measured for the full cell lithium secondary batteries prepared according to Example and Comparative Examples 1 and 2, and the results thereof are presented in FIG. 3.

Referring to FIG. 3,

Example was a case of blending Mn-rich having a large amount of Li$_2$MnO$_3$ (particularly, 0.3<a<0.6 in Chemical Formula 1) and doped-LFP, wherein it may be understood that a ratio of the Mn-rich appearing above a discharge voltage of the LFP may not only be high due to the combination of the Mn-rich having a large amount of Li$_2$MnO$_3$ and the LFP having a low discharge region, but the power may also be stably maintained without a rapid increase in resistance in a low SOC range (a SOC range of about 10% to 40% in FIG. 3) and an available SOC range may also be considerably wide.

Comparative Example 1 was a case of blending Mn-rich having a large amount of Li$_2$MnO$_3$ and pure-LFP, wherein since the LFP (discharge voltage of about 3.4 V) excessively early participated in discharge, resistance rapidly increased (i.e., power rapidly decreased) in a low SOC range (a SOC range of about 10% to 40% in FIG. 3) in which power assistance was urgently required, and thus, it may be understood that an available SOC range was relatively narrow in comparison to Example and safety was also reduced.

Comparative Example 2 was a case of using Mn-rich having a large amount of Li$_2$MnO$_3$ alone as a cathode active material, wherein since resistance significantly and rapidly increased at a lower end of SOC (a SOC range of about 50% or less in FIG. 3), it may be understood that an available SOC range was overall relatively narrow and safety was also reduced.

(Since the data shown in FIG. 3 are merely exemplary and detailed resistance (or power) values according to SOC may vary according to the specification of each cell, tendencies of the graphs may be more important than the detailed values.)

Eventually, since the mixed cathode active material of Mn-rich having high capacity and LFP modified (substituted) to have low operating voltage was used, the lithium secondary battery according to the present invention may widen an available SOC range by assisting the low power of the Mn-rich in a low SOC range. Furthermore, it may be confirmed that the safety of the cell may be significantly improved by blending of the Mn-rich having excellent safety and the LFP.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

A mixed cathode active material according to the present invention is prepared by mixing Mn-rich and a second cathode active material exhibiting a low discharge region in which a portion of Fe in pure LFP is substituted with Ti or the like, wherein since the substituted LFP is used, the present invention may provide a lithium secondary battery in which power characteristics and safety of the cell are significantly improved in comparison to a case, in which a rapid increase in resistance (power reduction) in a low SOC range may not be sufficiently compensated when Mn-rich and pure-LFP are blended.

The invention claimed is:

1. A mixed cathode active material comprising:
lithium manganese oxide represented by Chemical Formula 1; and
a second cathode active material represented by Chemical Formula 2-1 having an operating voltage of 2.5 V to 3.4 V, and included in an amount of 5 parts by weight to 30 parts by weight based on 100 parts by weight of the mixed cathode active material:

$a$Li$_2$MnO$_3$·(1−$a$)Li$_b$MO$_2$      [Chemical Formula 1]

where 0.3<a<0.6, 0.9≤b≤1.2, and M is one, two or more elements selected from aluminum (Al), magnesium (Mg), manganese (Mn), nickel (Ni), cobalt (Co), chromium (Cr), vanadium (V), or iron (Fe); and LiFe$_{1-z}$M'$_z$PO$_4$      [Chemical Formula 2-1]

where M' is at least one of the elements selected from scandium (Sc), titanium (Ti), Cr, or V,
and 0<z<0.25.

2. The mixed cathode active material of claim 1, further comprising lithium manganese oxide represented by Chemical Formula 1-1

$a$Li$_2$MnO$_3$·(1−$a$)LiM"O$_2$      [Chemical Formula 1-1]

where, 0.3<a<0.6, and M" is one, or two or more elements selected from Al, Mg, Mn, Ni, Co, Cr, V, or Fe.

3. The mixed cathode active material of claim 1, further comprising a conductive agent in addition to the lithium manganese oxide and the second cathode active material.

4. The mixed cathode active material of claim 3, wherein the conductive agent comprises graphite and conductive carbon.

5. The mixed cathode active material of claim 3, wherein the conductive agent is included in an amount of 0.5 parts by weight to 15 parts by weight based on 100 parts by weight of the mixed cathode active material.

6. The mixed cathode active material of claim 4, wherein the conductive carbon is one or a mixture of two or more of carbon black including acetylene black, Ketjen black, channel black, furnace black, lamp black, or thermal black, or a material having a crystal structure of graphene or graphite.

7. The mixed cathode active material of claim 1, further comprising one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

8. The mixed cathode active material of claim 7, wherein the other elements are one or more selected from the group consisting of Al, Mg, Ni, Co, Fe, Cr, V, Ti, Cu, boron (B), calcium (Ca), Zn, zirconium (Zr), niobium (Nb), molybdenum (Mo), strontium (Sr), Sb, tungsten (W), and bismuth (Bi).

9. The mixed cathode active material of claim 7, wherein the lithium-containing metal oxide is included in an amount of 50 parts by weight or less based on 100 parts by weight of the mixed cathode active material.

10. A cathode comprising the mixed cathode active material of claim 1.

11. A lithium secondary battery comprising the cathode of claim 10.

12. The lithium secondary battery of claim 11, wherein power of the lithium secondary battery in a SOC (state of charge) range of 20% to 40% is 40% or more of power at 50% SOC.

\* \* \* \* \*